United States Patent [19]

Hosono

[11] 4,163,178
[45] Jul. 31, 1979

[54] FLASH LIGHT DISCHARGE DEVICE

[75] Inventor: Tsutomu Hosono, Tokyo, Japan

[73] Assignee: Fuji Photo Optical Co., Ltd., Omiya, Japan

[21] Appl. No.: 788,606

[22] Filed: Apr. 18, 1977

[30] Foreign Application Priority Data

Apr. 16, 1976 [JP] Japan .................................. 51-43316
May 15, 1976 [JP] Japan ............................ 51-61502[U]

[51] Int. Cl.² ..................... H05B 37/00; H05B 39/00; H05B 41/14
[52] U.S. Cl. ................................. 315/241 P; 315/362
[58] Field of Search .......... 315/129, 133, 239, 241 R, 315/241 P, 362; 354/127, 145; 340/248 D; 320/1; 307/109

[56] References Cited

U.S. PATENT DOCUMENTS

| | | | |
|---|---|---|---|
| 3,526,821 | 9/1970 | Thomas | 320/1 |
| 3,764,849 | 10/1973 | Ohta | 315/241 R X |
| 3,890,538 | 6/1975 | Iwata et al. | 315/241 P |
| 3,898,514 | 8/1975 | Takahashi | 315/241 P X |
| 4,068,150 | 1/1978 | Iwata et al. | 315/241 P |

Primary Examiner—Alfred E. Smith
Assistant Examiner—Robert E. Wise
Attorney, Agent, or Firm—Harold L. Stults

[57] ABSTRACT

In a flash discharge device including a strobe tube attached to a camera body, use is made of both the positive and negative outputs of a blocking oscillator. One output is used for charging a main capacitor to supply power to actuate the strobe tube, and the other output is used for energizing one or more indicators. Both the outputs may be used to accelerate the charging of the capacitor. The indicator energized by the output of the blocking oscillator while the main capacitor being charged may be an indicator which indicates that condition by intermittent lighting.

7 Claims, 6 Drawing Figures

FLASH LIGHT DISCHARGE DEVICE

BACKGROUND OF THE INVENTION

1. Field of the Invention

This invention relates to a flash discharge device including a flash discharge tube attached to a camera body, and more particularly to a flash discharge device provided with warning indicators.

2. Description of the Prior Art

In a flash discharge device (hereinafter referred to as "strobe device") including a flash discharge tube (hereinafter referred to as "strobe"), a main capacitor is employed to store electrical energy and, upon demand, to transfer the energy to the strobe, and a power source is provided to charge the main capacitor. Since the level of the voltage of the power source is comparatively low (from a few volts to ten or more volts), it takes a long time to charge the main capacitor. When it is desired to take several flash pictures in succession, the time for charging the main capacitor should preferably be as short as possible. Therefore, in order to shorten the charging time, it has been the practice to use a blocking oscillator in the strobe device.

Since the output voltage of the oscillator alternates between plus and minus, a rectifier is used to select either the positive or the negative output of the oscillator to be used to charge the capacitor. This means that only half of the charging time contributes to the charging of the capacitor and the remaining half is wasted.

A further disadvantage of conventional strobe devices is that the output of the oscillator is almost consumed in charging the main capacitor and therefore an indicator lamp connected with the strobe device to indicate that the capacitor is being charged would not light up immediately after the start of charging.

SUMMARY OF THE INVENTION

The primary object of the present invention is to provide a strobe device in which the output of the oscillator therein is used most efficiently for charging the main capacitor.

A more specific object of the present invention is to provide a strobe device in which the output of the oscillator therein is used for energizing an electrically operated device even when the output is not used for charging the capacitor.

Another object of the present invention is to provide a strobe device in which both the positive and negative parts of the alternating output voltage of the oscillator are used for charging the main capacitor.

A further object of the present invention is to provide a strobe device having an indicator light which indicates that the main capacitor is being charged and is lit immediately after the start of charging.

A still further object of the present invention is to provide a strobe device having a first indicator which indicates that the charging circuit is closed and a second indicator which indicates that the charging is completed.

The above objects are accomplished by providing a plurality of rectifier output terminals on the oscillator of a strobe circuit and obtaining rectified output signals from each of these terminals. For instance, a positive rectified signal is obtained from one output terminal of the oscillator, and a negative rectified signal is taken from another output terminal. While one output is used for charging the main capacitor, another output may be used for energizing an indicator. Further, it is possible to use both the outputs for charging the main capacitor. When one output is used for energizing an indicator which indicates that the main capacitor is being charged while the other output is used for charging the capacitor, the indicator can be lit immediately after the start of charging of the capacitor.

DESCRIPTION OF THE PREFERRED EMBODIMENTS

Figure 1:
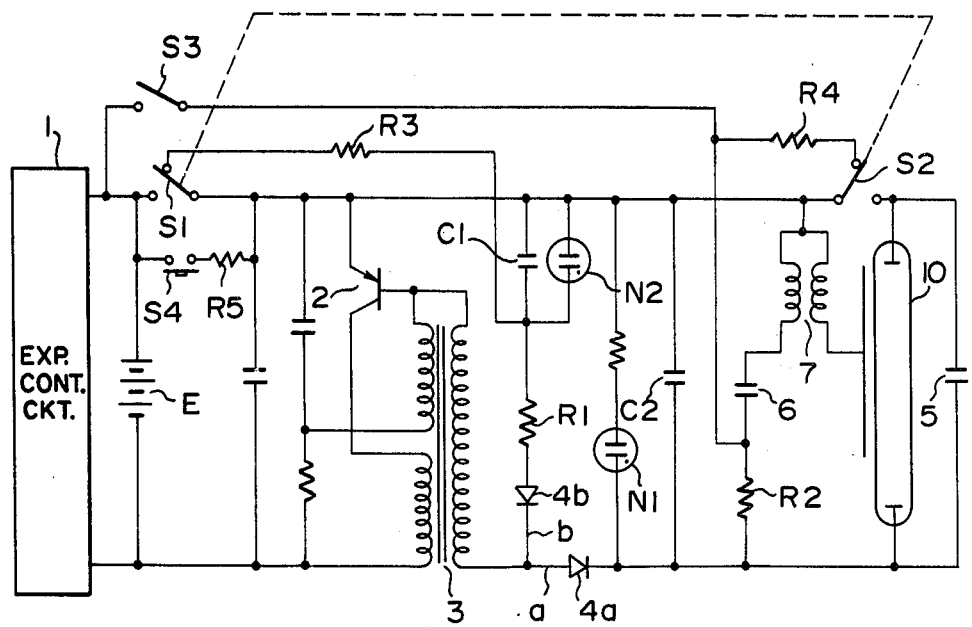
FIG. 1 is a circuit of one embodiment of an electric circuit employed in the strobe device in accordance with the present invention.

Referring to FIG. 1 which shows an example of an electric circuit for driving a strobe device in accordance with the present invention, a single power source E is commonly used for energizing an exposure control circuit 1 and a strobe discharging circuit including a blocking oscillator 3 and a main capacitor 5. A power switch S1 is connected between the power source E and a transistor 2 of the oscillator 3. The power switch S1 is opened in the state shown in FIG. 1. When the power switch S1 is closed (in which condition the arm of the switch is separated from a contact connected with a resistor R3), a relay switch S2 is ganged with the switch S1 changed over to connect the main capacitor 5 to the blocking oscillator 3. In this case, an output terminal of the blocking oscillator 3 is connected with the main capacitor 5 by way of a first lead a and a first diode 4a, which half-wave rectifiers the output of the blocking oscillator 3 to provide, for instance, the positive output signal for charging the main capacitor 5. Then, when the terminal voltage of the main capacitor 5 has reached a level high enough to discharge the strobe tube 10, a neon tube N1 is lit to indicate that taking a flash photograph has become possible. A synchronizing trigger switch S3 is connected in series between the exposure control circuit 1 and one side of a trigger capacitor 6 the other side of which is connected to a trigger coil 7. Closing the switch S3 allows the capacitor 6 to discharge through the trigger coil 7 and make the strobe tube 10 flash. A charging resistor R2 is connected in series with the trigger capacitor 6.

The output terminal of the blocking oscillator 3 has a second lead b connected to a second diode 4b that produces a half-wave rectified negative output of the oscillator 3. The second diode 4b is connected in series with a parallel circuit of a capacitor C1 and a neon tube N2 by way of a charging resistor R1. When the terminal voltage of the capacitor C1 has reached a predetermined level, the neon tube N2 is lit, and the capacitor C1 is discharged by a voltage corresponding to the hysteresis voltage of the neon tube N2. Simultaneously, the capacitor C1 is charged by the output of the blocking oscillator 3 by way of the second output lead b thereof and the resistor R1. Therefore, as a result, the neon tube N2 is intermittently lit to indicate that the power switch S1 is closed to charge the main capacitor 5.

When the power switch S1 is returned to its original position as shown in FIG. 1 to stop the charging of the main capacitor 5, the relay switch S2 is similarly changed over to its original position and the neon tube energizing capacitor C1 and the trigger capacitor 6 are short-circuited by way of the resistors R3 and R4. Accordingly, any malfunction that would be caused by the residual charge remaining in the capacitor C1 and the trigger capacitor 6 is prevented.

The circuit is further provided with a battery check switch S4 to allow the photographer to determine whether or not the level of the source voltage of the power source E is above a predetermined level while the power switch S1 is in the off position as shown in FIG. 1. The predetermined level can be controlled by an adjusting resistor R5. A neon tube N1 is connected in parallel with a capacitor C2 so that, if the level of the source voltage is above the predetermined value, the neon tube N1 is lit when the battery check switch is closed, provided, the capacitor C2 is charged up to a level determined by the adjusting resistor R5. In order that the neon tube N2 may not be lit even when the battery check switch S4 is closed, a resistor R3 is connected across the capacitor C1.

In summary, in the above described embodiment as shown in FIG. 1, the output of the blocking oscillator 3 is used both for charging the main capacitor 5 and for energizing the indicator tube N2. The main capacitor 5 is used to actuate the strobe 10, and the indicator tube N2 is used for indicating that the main capacitor 5 is being charged. Further, when the main capacitor 5 is charged up, the neon tube N1 is lit to indicate the completion of the charging. The indicating tube N1 is further used as a battery check tube when the power is not connected to the main capacitor 5. The tube N1 is lit upon operation of a battery check switch when the voltage of the power source is above a predetermined level.

Figure 2:
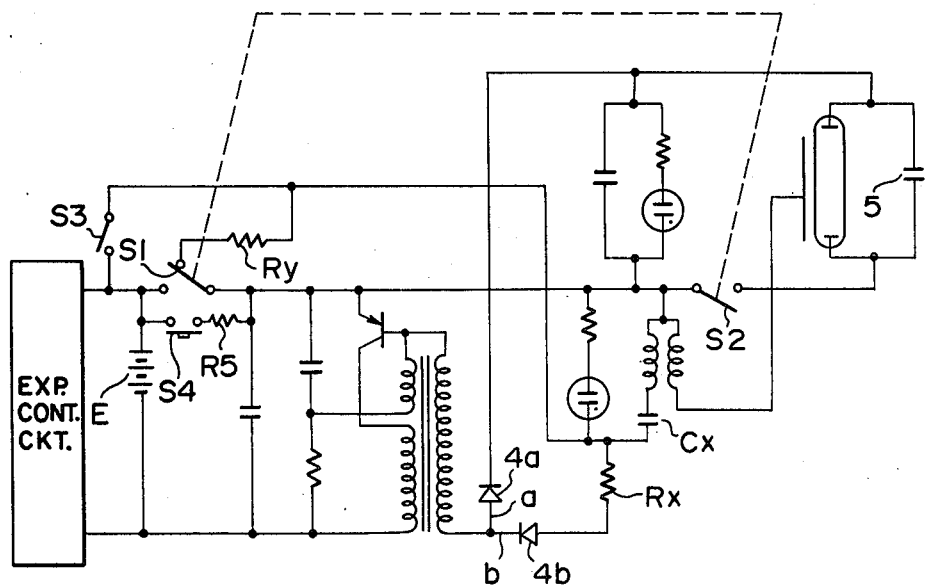
FIG. 2 is a circuit of another embodiment of an electric circuit employed in the strobe device in accordance with the present invention.

A second embodiment of the present invention will be described with reference to FIG. 2. In the circuit shown in FIG. 2, a single capacitor Cx is substituted for the capacitor C1 and the trigger capacitor 6, a single resistor Rx is substituted for the two charging resistors R1 and R2, and a single resistor Ry is substituted for the two discharging resistors R3 and R4 in the first embodiment shown in FIG. 1 to reduce the number of capacitors and resistors and to simplify the structure of the circuit. The elements in the second embodiment equivalent to those shown in FIG. 1 are designated by the same reference numerals.

In accordance with the above described embodiments of the present invention, indicators are provided in a strobe device and are energized simultaneously with the energization of the strobe device by utilizing the negative output of a blocking oscillator while the positive output is used to charge the main capacitor in the strobe device.

Figure 3:
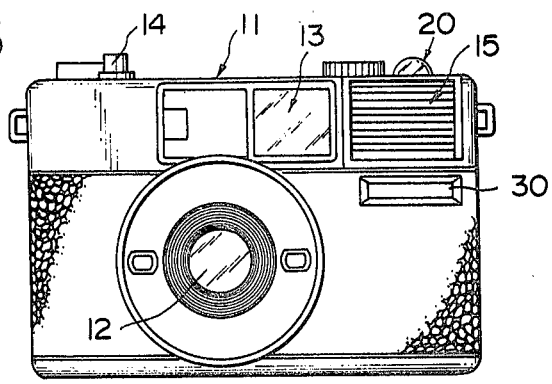
FIG. 3 is a front view of a photographic camera in which the strobe device made in accordance with the present invention is incorporated.

In the strobe device provided with indicators of different kinds as described hereinabove, it is desired that the different kinds of indicators be distinguished from each other. On the other hand, in order to save the space on camera body, it is desired that the indicators be combined into one lamp. One lamp can be used to indicate different kinds of states by changing its mode of lighting. One example of a camera body provided with an indicator lamp as well as a strobe tube is illustrated in FIG. 3. Referring to FIG. 3, a camera body 11 has on its front face a taking lens 12, a view-finder window 13 and a strobe 15. The camera body 11 has a shutter release button 14 on its top face. The camera body 11 also has an indicator 20 on its face. A power switch 30 corresponding to the switch S1 in FIG. 1 provided on the front face of the camera body 11.

Figure 4:
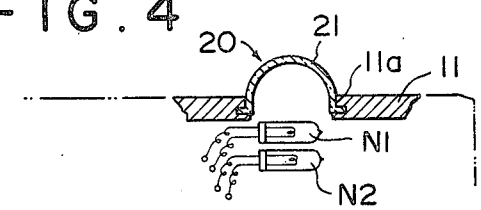
FIG. 4 is a sectional view showing an example of indicators employed in the strobe device in accordance with the present invention.

The internal structure of the indicator 20 is shown in detail in FIG. 4. A semi-cylindrical glass 21 is fixed to an opening 11a provided in the top face of the camera body 11 and two neon tubes N1 and N2 are disposed under the glass 21. The glass 21 may be of a light diffusion type, or it may be replaced by a light diffusing plastic plate. In order to indicate the different kinds of states by means of the two neon tubes N1 and N2, the color of the light emitted by the two neon tubes is made different. For instance, the first neon tube N1 used for indicating that the main capacitor is charged up has, on its internal face, a phosphor coating layer that emits green light when the tube is discharged, and this green light may be observed through the indicator 20. The second neon tube N2 used for indicating that the main capacitor is being charged or that the source voltage is above a predetermined level has a transparent glass tube and emits orange light when excited. Thus, the two kinds of indication are distinguished from each other by the color of the light observed at the indicator 20.

In operation of the indicator 20 constructed as described above, the second neon tube N2 is intermittently lit to indicate that the power switch S1 is closed and the main capacitor is being charged when the main switch is closed. The intermittent indication is made in orange in color. When the main capacitor is charged up and the camera becomes ready to take a flash photograph, the first neon tube N1 is turned on to emit green light in the indicator 20. When the green light is emitted by the first neon tube N1, the orange light emitted by the second neon tube N2 is also viewed through the indicator 20. However, since the green light is clearly observed in the indicator 20, the photographer can easily recognize that the main capacitor has been fully charged up.

Figure 5A:
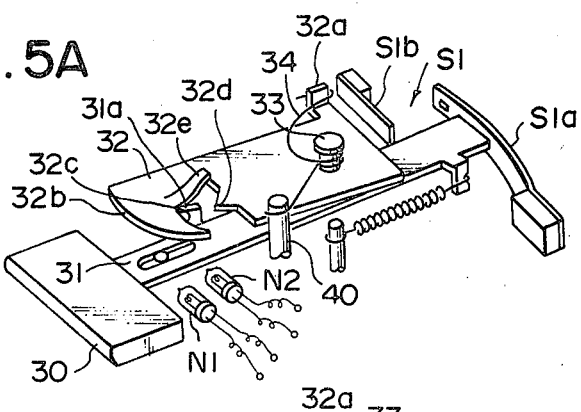
FIGS. 5A and 5B are fragmentary perspective views showing an example of a mechanism for operating a power switch in the strobe device in accordance with the present invention.
Figure 5B:
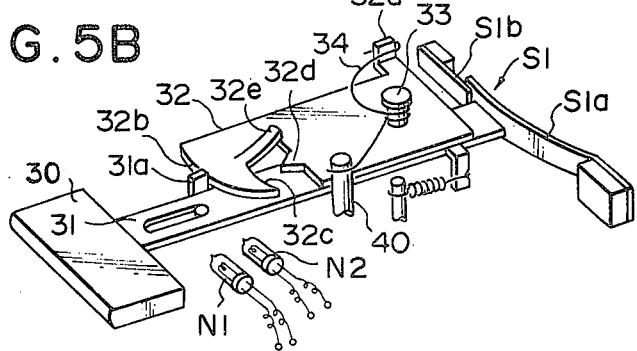

The detailed internal mechanical structure of the power switch 30 will now be described with reference to FIGS. 5A and 5B. The power switch structure has a manually operable switch button exposed 30 exposed on the front face of the camera body 11. The switch button 30 is movable between a depressed position as shown in FIG. 5A and a projected position as shown in FIG. 5B. The switch button 30 is fixed to the front end of a slide lever 31 which is slidably held in the camera body 11. The slidable lever 31 is engageable with a cam lever 32. When the slidable lever 31 is engaged with the cam lever 32, the button 30 is in its depressed position, and when the slidable lever 31 is disengaged from the cam lever 32, the button 30 is in its projected position. The cam lever 32 is mounted to pivot about the axis of a pivot 33 and is further movable in a direction at an angle to the axis of the pivot 33 so that the front end of the lever 32 can be separated from the slidable lever 31. The front end of the cam lever 32 is separated in FIG. 5A and is in contact with the slidable lever 31 in FIG. 5B. The cam lever 32 is provided with an upwardly bent portion 32a and one end of a spring 34 is engaged with the upwardly bent portion. The spring 34 has a coil portion wound around the pivot 33 and the other end of the spring 34 is engaged with a stopper pin 40 to urge the cam lever 32 in the counterclockwise direction and further to urge the cam lever 32 to be in contact with the slidable lever 31. The cam lever 32 is provided with a cam face 32b along which an engaging projection 31a formed on the slidable lever 31 slides. The cam lever 32 is further provided with a cut-away portion 32c which is engageable with the engaging projection 31a. The cut-away portion 32c of the cam lever 32 is provided with an engaging extension 32d and a tapered rising portion 32e. The switch S1 comprises a fixed contact S1b and a movable contact S1a which is separated from the fixed contact S1b when the slidable lever 31 is moved to the right, as shown in FIG. 5A, upon depression of the switch button 30. The movable contact S1a is urged to be in contact with the fixed contact S1b and is brought into contact the the fixed contact S1b when the switch button 30 is in the projected position as shown in FIG. 5B.

In operation of the switch as described hereinabove, the switch button 30 is in the depressed position and the switch S1 is opened in the state shown in FIG. 5A. Then, when the switch button 30 is depressed and released, the engaging projection 31a of the slide lever 31 slips in under the tapered rising portion 32e of the cam lever 32 as the cam lever 32 swings counterclockwise and then the engaging projection 31a slides on the back face of the cam lever 32 to the left until the engaging projection 31a appears at the cam face 32b of the cam lever 32 as shown in FIG. 5B. While the engaging projection 31a slides on the back face of the cam lever 32, the front end of the cam lever 32 is separated from the slide lever 31. Then, when the switch button 30 is again depressed, the engaging portion 31 of the slide lever 31 slides along the cam face 32b of the cam lever 32 to effect the colckwise swing of the cam lever 32 until the engaging portion 31a slips into the cut-away portion 32c of the cam lever 32. When the engaging portion 31a slips into the cut-away portion 32c, the mechanism returns to its original position as shown in FIG. 5A.

I claim:
1. A flash discharge device comprising:
   a blocking oscillator;
   a first rectifier connected to said blocking oscillator to receive output signals therefrom and polarized to rectify output signals in one polarity;
   a strobe circuit connected to said first rectifier and comprising a strobe tube and a main capacitor connected thereto to store electric charge supplied through said first rectifier to operate said strobe tube;
   a second rectifier connected to said blocking oscillator to receive output signals therefrom and polarized oppositely from said first rectifier to rectify in the opposite polarity said blocking oscillator output signals applied to said second rectifier; and
   voltage indicating means connected to said second rectifier to be energized by the oppositely polarized rectified signals therefrom,
   said voltage indicating means comprising:
   a neon tube,
   a second capacitor connected in parallel with said neon tube,
   a resistor connected in series with said second capacitor and said second rectifier, and
   switching means connected to said voltage indicating means and said blocking oscillator to cause said neon tube to flash periodically and thereby periodically discharge said second capacitor while said blocking oscillator is operating to charge said main capacitor.

2. The flash discharge device of claim 1 comprising conductive means connected to said second capacitor and said switching means to be connected across said second capacitor by said switching means to prevent said second capacitor from charging when said blocking oscillator is not operating.

3. A flash discharge device comprising:
   a blocking oscillator;
   a first rectifier connected to said blocking oscillator to receive output signals therefrom and polarized to rectify output signals in one polarity;
   a strobe circuit connected to said first rectifier and comprising a strobe tube and a main capacitor connected thereto to store electric charge supplied through said first rectifier to operate said strobe tube;
   a second rectifier connected to said blocking oscillator to receive output signals therefrom and polarized oppositely from said first rectifier to rectify in the opposite polarity said blocking oscillator output signals applied to said second rectifier;
   voltage indicating means connected to said second rectifier to be energized by the oppositely polarized rectified signals therefrom;
   means constituting a source of operating voltage for said blocking oscillator; and
   switching means selectively connecting said source to said oscillator and said capacitor to said oscillator, said voltage indicating means indicating when said oscillator is connected to said source of operating voltage and said capacitor is connected to said oscillator and to said first rectifier to receive the electric charge therefrom.

4. The flash discharge device of claim 3 in which said switching means comprises:
   a first switch connected between said source of operating voltage and said blocking oscillator; and
   a second switch connected between said blocking oscillator and said strobe circuit.

5. The flash discharge circuit of claim 4 in which said first and second switches are ganged together to connect said strobe circuit to said blocking oscillator when said blocking oscillator is connected to said source of operating voltage.

6. The flash discharge device of claim 3 comprising:
   second voltage indicating means connected to said first rectifier and to said switching means to indicate the voltage across said capacitor when said switching means connects said capacitor to said oscillator.

7. The flash discharge device of claim 3 comprising:
   second switching means connecting said source to said oscillator; and
   second voltage indicating means connected to said first rectifier to indicate that said source has at least a predetermined voltage output.

* * * * *